US012662029B2

(12) United States Patent
   Hyun

(10) Patent No.: US 12,662,029 B2
(45) Date of Patent: Jun. 23, 2026

(54) COLLISION LOCKING DEVICE FOR REAR SPLIT SEAT OF VEHICLE

(71) Applicant: HYUNDAI TRANSYS INC., Seosan-si (KR)

(72) Inventor: Joo Bong Hyun, Seoul (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 166 days.

(21) Appl. No.: 18/424,986

(22) Filed: Jan. 29, 2024

(65) Prior Publication Data

US 2024/0262267 A1 Aug. 8, 2024

(30) Foreign Application Priority Data

Feb. 7, 2023 (KR) ........................ 10-2023-0016283

(51) Int. Cl.
B60N 2/433 (2006.01)

(52) U.S. Cl.
CPC .................................... B60N 2/433 (2013.01)

(58) Field of Classification Search
CPC ....................................................... B60N 2/433
See application file for complete search history.

(56) References Cited

U.S. PATENT DOCUMENTS

| | | | | |
|---|---|---|---|---|
| 7,032,973 B2 * | 4/2006 | Reubeuze | ............... | E05B 85/26 |
| | | | | 292/121 |
| 7,494,187 B2 * | 2/2009 | Inoue | ..................... | B60N 2/366 |
| | | | | 297/378.13 |
| 10,189,383 B2 * | 1/2019 | Dill | ........................... | B60N 2/20 |
| 2005/0023877 A1 * | 2/2005 | Vermeulen | .............. | E05B 81/14 |
| | | | | 297/378.13 |
| 2006/0061184 A1 * | 3/2006 | Jennings | ................ | B60N 2/366 |
| | | | | 297/378.12 |

(Continued)

FOREIGN PATENT DOCUMENTS

| | | | | |
|---|---|---|---|---|
| DE | 19522128 A1 * | 1/1997 | ............... | B60N 2/20 |
| DE | 19926524 A1 * | 12/2000 | ............. | B60N 2/366 |

(Continued)

OTHER PUBLICATIONS

Request for Submission of an Opinion in Korean Application No. 10-2023-0016283 dated Oct. 29, 2024.

(Continued)

*Primary Examiner* — Joshua J Michener
*Assistant Examiner* — Ryan Andrew Yankey
(74) *Attorney, Agent, or Firm* — Quantum Patent Law Firm; Seongyoune Kang

(57) ABSTRACT

Disclosed is a collision locking device for a rear split seat of a vehicle, the collision locking device including a striker structure mounted on a seatback of a left seat of the rear split seat or a seatback of a right seat thereof and a locking device mounted on the seatback of the left seat of the rear split seat or the seatback of the right seat thereof, wherein the seatback of the left seat and the seatback of the right seat are coupled to each other by a locking operation of the locking device configured to be locked and coupled to the striker structure in the event of impact occurrence due to vehicle collision, thereby preventing the seatback of the left seat or the seatback of the right seat from being deformed form the original position thereof.

19 Claims, 6 Drawing Sheets

(56) References Cited

U.S. PATENT DOCUMENTS

| | | | |
|---|---|---|---|
| 2020/0130550 A1 | 4/2020 | Stewart et al. | |
| 2020/0386018 A1* | 12/2020 | Sogamoto | B60N 2/2245 |

FOREIGN PATENT DOCUMENTS

| | | | | |
|---|---|---|---|---|
| DE | 202020100306 U1 * | 2/2020 | ............ | E05B 85/24 |
| JP | H08216750 A * | 8/1996 | | |
| JP | 2002-201843 A | 7/2002 | | |
| JP | 5237505 B2 * | 7/2013 | .............. | B60N 2/01 |
| JP | 2018-023491 A | 2/2018 | | |
| JP | 2020-200592 A | 12/2020 | | |
| JP | 2023039537 A * | 3/2023 | | |
| JP | 7648887 B2 * | 3/2025 | | |
| KR | 10-0128568 B1 | 1/1997 | | |
| KR | 20-1998-0033248 U | 9/1998 | | |
| WO | WO-2013178489 A1 * | 12/2013 | ............ | B60N 2/366 |
| WO | WO-2018172338 A1 * | 9/2018 | ............ | B60N 2/433 |

OTHER PUBLICATIONS

Decision to Grant in Korea Application No. 10-2023-0016283 dated Jun. 13, 2025.

* cited by examiner

Related Art

FIG. 4

COLLISION LOCKING DEVICE FOR REAR SPLIT SEAT OF VEHICLE

CROSS-REFERENCE TO RELATED APPLICATION

This application claims, under 35 U.S.C. § 119(a), priority to Korean Patent Application No. 10-2023-0016283, filed on Feb. 7, 2023, the entire contents of which are incorporated herein by reference.

BACKGROUND

(a) Technical Field

The present disclosure relates to a collision locking device for a rear split seat of a vehicle. More particularly, it relates to a collision locking device for a rear split seat of a vehicle configured to prevent deformation of the rear split seat by allowing a left seat and a right seat of the rear split seat to be coupled to each other in the event of vehicle collision.

(b) Background Art

Generally, a rear seat of a vehicle may be installed in various arrangements. For example, a rear seat of a vehicle is installed in the form of a split seat in which three seats including a center seat, a left seat, and a right seat are arranged adjacent to each other, or in the form of a split seat in which two seats including a left seat and a right seat are arranged adjacent to each other. In addition, a left seat and a right seat are installed in an independent arrangement.

For example, in the case of the rear split seat, the left seat and the right seat including the center seat may be split in the ratio of 6:4.

Referring to FIG. 1, in the case of a rear split seat divided into a left seat and a right seat, a seatback of the left seat 10 and a seatback of the right seat 20 that include a center seat are connected to each other by a center hinge assembly 30. Accordingly, the seatback of the left seat 10 or the seatback of the right seat 20 are rotated around the center hinge assembly 30, thereby performing reclining, folding, and unfolding operations.

In this case, a seatbelt anchor 40 adopted to guide a seatbelt for the center seat 42 is mounted on the seatback of the right seat 20 including the center seat and, as such, a passenger seated on the center seat located between the left and right seats may also wear the seatbelt for the center seat 42.

However, a conventional rear split seat has the following problems.

First, since a seatback of a left seat and a seatback of a right seat that constitute a rear split seat are connected to each other only by a center hinge assembly, there is a problem in that rigidity of an interface between the left seat and the right seat is weak.

Second, since rigidity of the interface between the left seat and the right seat is weak, in the event of vehicle collision, passenger load or impact force of luggage loaded in the luggage compartment is applied to the seatback of the left seat or the seatback of the right seat. As a result, the seatback of the left seat or the seatback of the right seat may be easily deformed when the seatback moves away from the original position thereof, which may result in a serious degree of injury of a passenger.

Third, the seatback of the left seat including the center seat is equipped with a seatbelt anchor adopted to guide the seatbelt for the center seat. Here, in the event of vehicle collision, the seatbelt anchor is damaged due to deformation of the left seat and, as such, a passenger wearing the seatbelt for the center seat may be seriously injured.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present device has been made in an effort to solve the above-described problems associated with the prior art, and it is an object of the present disclosure to provide a collision locking device for a rear split seat of a vehicle, the collision locking device including a striker structure mounted on a seatback of a left seat of the rear split seat or a seatback of a right seat thereof and a locking device mounted on the seatback of the left seat of the rear split seat or the seatback of the right seat thereof, wherein the seatback of the left seat and the seatback of the right seat are coupled to each other by a locking operation of the locking device configured to be locked and coupled to the striker structure in the event of impact occurrence due to vehicle collision, thereby preventing the seatback of the left seat or the seatback of the right seat from being deformed form the original position thereof.

In one aspect, the present device provides a collision locking device for a rear split seat of a vehicle, the collision locking device including a striker structure mounted on a seatback of a left seat of the rear split seat or a seatback of a right seat thereof, and a locking device mounted on the seatback of the left seat of the rear split seat or the seatback of the right seat thereof and operated so as to be locked and coupled to the striker structure by inertial force resulting from vehicle collision, wherein the seatback of the left seat and the seatback of the right seat are coupled to each other by a locking operation of the locking device configured to be locked and coupled to the striker structure.

In a preferred embodiment, the striker structure may include a case having a first opening formed on one side thereof, the one side facing the locking device, and a striker configured to connect an upper surface of the case and a lower surface thereof and exposed toward the locking device.

In another preferred embodiment, the locking device may include a housing having a second opening formed on one side thereof, the one side facing the striker structure, a stopper mounted at a predetermined position of a front portion of the housing so as to be movable forwards and rearwards, a spring configured to compressively connect a front wall of the housing to the stopper, a weight coupled to the stopper, a locking trigger having a hook part formed at a front end thereof and caught by the striker, a locking groove formed at a rear portion of the hook part and configured to allow a rear end of the stopper to be lockably inserted thereinto, and a sector gear formed at a rear end thereof, wherein the locking trigger is rotatably mounted at a predetermined position of a rear portion of the housing, a middle gear engaged with the sector gear of the locking trigger and rotatably mounted in the housing, and a coil spring connected between a shaft of the middle gear and a predetermined position of the housing, wherein the coil spring provides elastic restoring force configured to allow the middle gear to be rotated in a direction of rotating the locking trigger toward the striker structure.

In still another preferred embodiment, the housing may have a middle cover mounted therein and an upper cover mounted on an upper portion thereof, wherein the middle cover may distinguish between a lower space configured to allow the stopper, the locking trigger, and the middle gear to be mounted therein and an upper space configured to allow the weight and the coil spring to be mounted therein, and the upper cover may seal the upper space.

In yet another preferred embodiment, the middle cover may have an upper slide hole formed thereon, and the housing may have a lower slide hole formed on a bottom wall thereof, wherein the upper slide hole and the lower slide hole may guide forward-and-rearward movement of the stopper and the weight, and the stopper may have an upper guidance pin and a lower guidance pin respectively formed to protrude from an upper surface of the stopper and a lower surface thereof, wherein the upper guidance pin and the lower guidance pin may be respectively inserted into the upper slide hole and the lower slide hole.

In still yet another preferred embodiment, the weight may be coupled to the upper guidance pin of the stopper passing through the upper slide hole.

In a further preferred embodiment, the upper cover may have a weight receiving groove formed to allow the weight to be mounted therein and configured to secure a space for forward-and-rearward movement of the weight.

In another further preferred embodiment, each of the housing and the middle cover may have a first hinge hole and a second hinge hole, wherein the first hinge hole and the second hinge hole may be formed on each of a bottom wall of the housing and the middle cover, the first hinge hole may allow a shaft of the locking trigger to be rotatably inserted thereinto and coupled thereto, and the second hinge hole may allow a shaft of the middle gear to be rotatably inserted thereinto and coupled thereto.

In still another further preferred embodiment, the middle cover may have a spring fixing end formed on an upper surface thereof and connected to an outer end of the coil spring, and the coil spring may have an inner end connected to the shaft of the middle gear passing through the first hinge hole.

In yet another further preferred embodiment, the lower space between a bottom surface of the housing and the middle cover may have a locking release bar further mounted therein and configured to be movable forwards and rearwards, wherein the locking release bar may include a rack gear engaged with the middle gear, and an operation knob formed to be integrated with a rear end of the rack gear and formed to extend outwards through a rear surface of the housing.

In still yet another further preferred embodiment, guidance holes may be respectively formed on the bottom wall of the housing and the middle cover, and the rack gear may have guidance protrusions respectively formed on an upper side and a lower side thereof, wherein each of the guidance protrusions may be slidably inserted into a corresponding one of the guidance holes.

Other aspects and preferred embodiments of the device are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present device, and wherein:

FIG. 4 is a side cross-sectional view showing the locking device among the components of the collision locking device for the rear split seat of the vehicle according to the present disclosure;

Figure 1:
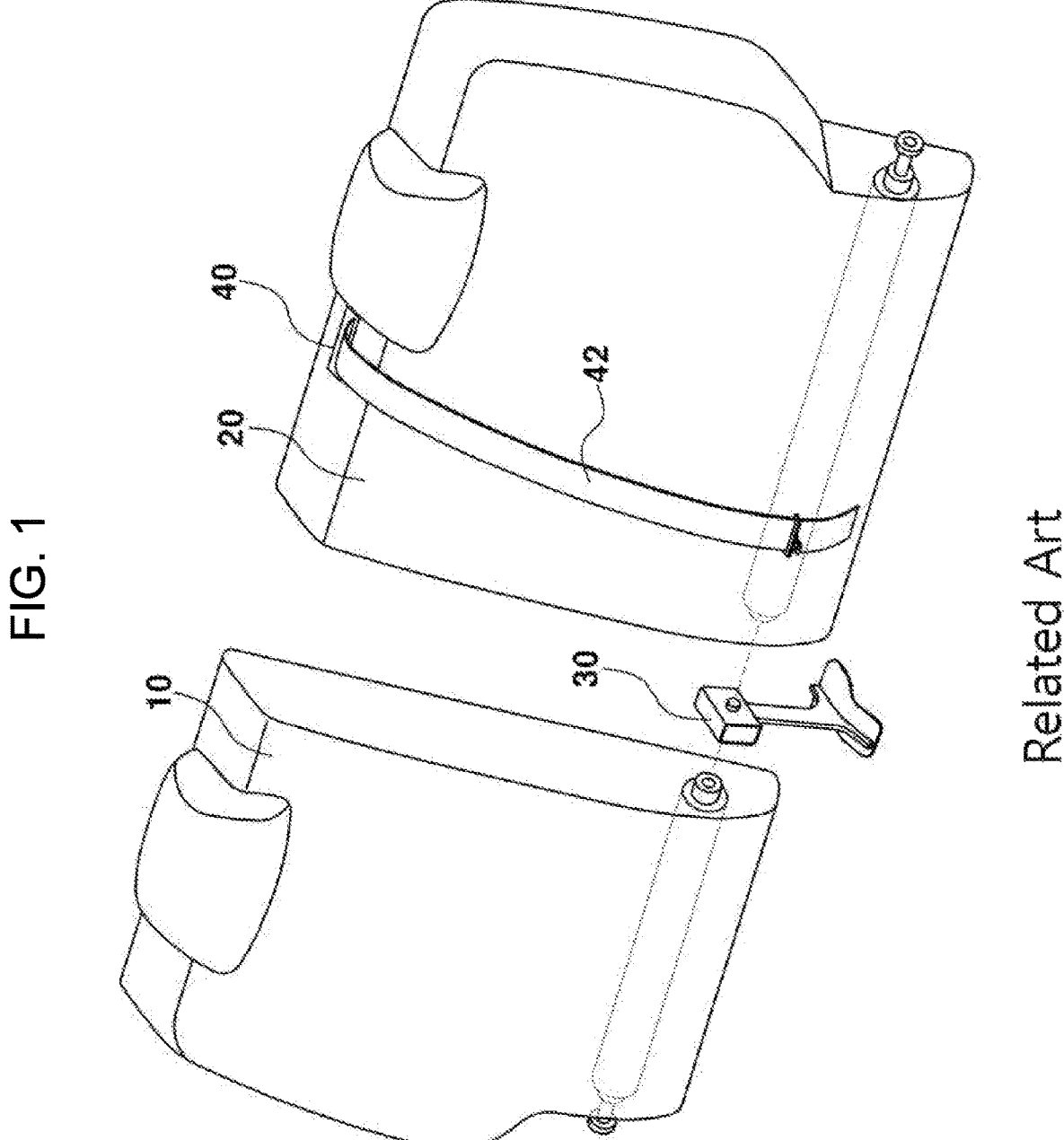
FIG. 1 is a schematic diagram showing the appearance of a seatback of a left seat of a rear split seat and a seatback of a right seat thereof in a separated state.

It should be understood that the appended drawings are not necessarily to scale, presenting a somewhat simplified representation of various preferred features illustrative of the basic principles of the device. The specific design features of the present device as disclosed herein, including, for example, specific dimensions, orientations, locations, and shapes will be determined in part by the particular intended application and use environment.

In the figures, reference numbers refer to the same or equivalent parts of the present device throughout the several figures of the drawing.

DETAILED DESCRIPTION

Hereinafter, reference will be made in detail to various embodiments of the present device, examples of which are illustrated in the accompanying drawings and described below.

Figure 2:
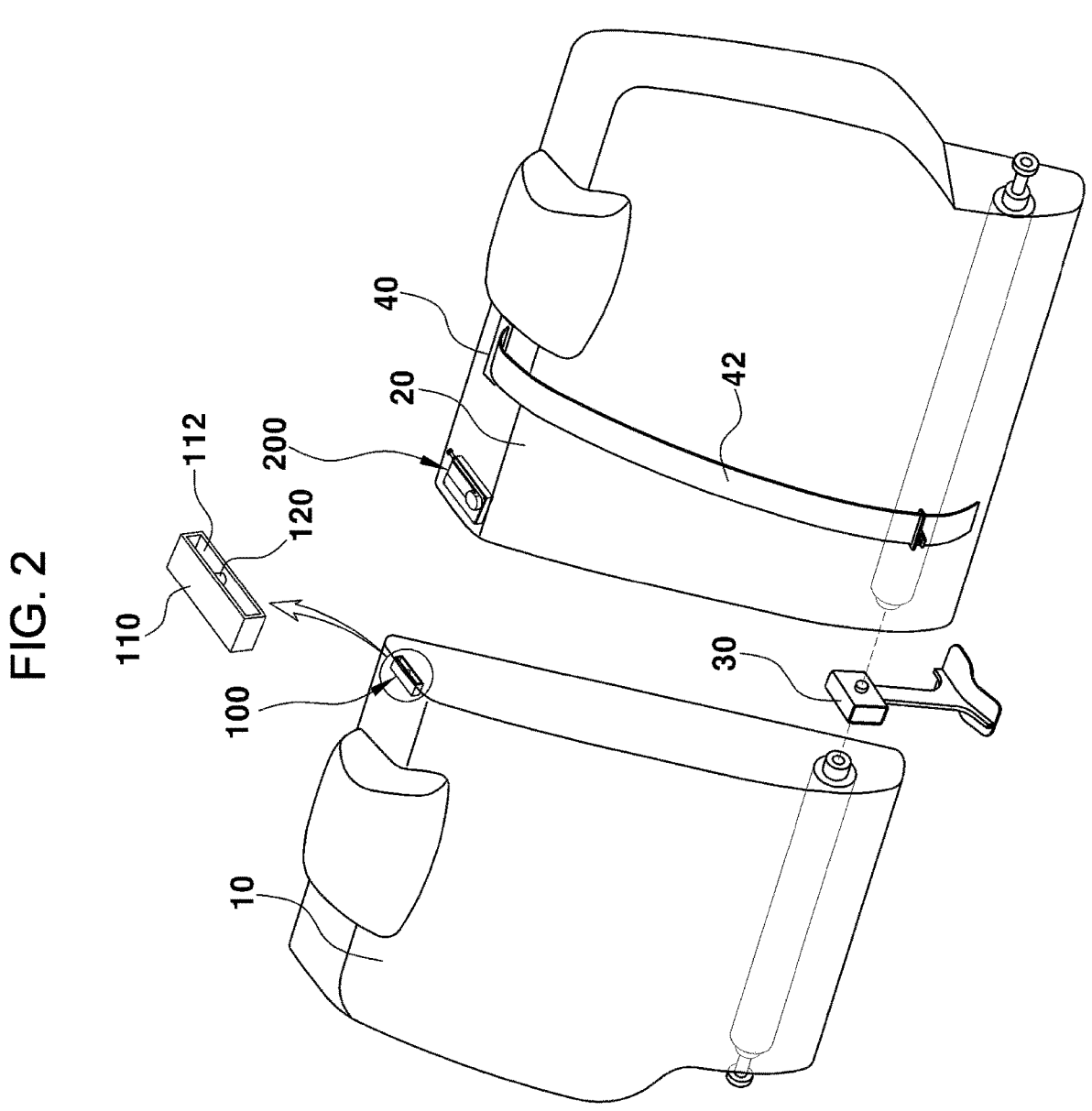
FIG. 2 is a schematic diagram showing a mounting position of a collision locking device for a rear split seat of a vehicle according to the present disclosure.

FIG. 2 is a schematic diagram showing a mounting position of a collision locking device for a rear split seat of a vehicle according to the present disclosure.

As shown in FIG. 2, the rear split seat is divided into a left seat and a right seat that include a center seat. Here, a striker structure 100 is mounted on a seatback of the left seat 10, and a locking device 200 is mounted on a seatback of the right seat 20.

Preferably, the striker structure 100 and the locking device 200 are respectively mounted on the inner surface of the seatback of the left seat 10 and the inner surface of the seatback of the right seat 20 so as to face each other.

The striker structure 100 may include a case 110 having a first opening 112 formed on one side thereof facing the locking device 200, in which the case 110 is mounted on the inner surface of the seatback of the left seat 10, and a striker 120 configured to connect the upper surface of the case 110 to the lower surface thereof and exposed toward the locking device 200 through the first opening 112.

The locking device 200 may be provided with an operating structure locked and coupled to the striker 120 of the striker structure 100 by inertial force resulting from vehicle collision.

Therefore, in the event of vehicle collision, when the locking device 200 is locked and coupled to the striker 120 of the striker structure 100, the seatback of the left seat 10 and the seatback of the right seat 20 may be coupled to each other.

Here, a detailed configuration of the locking device will be described.

Figure 3:
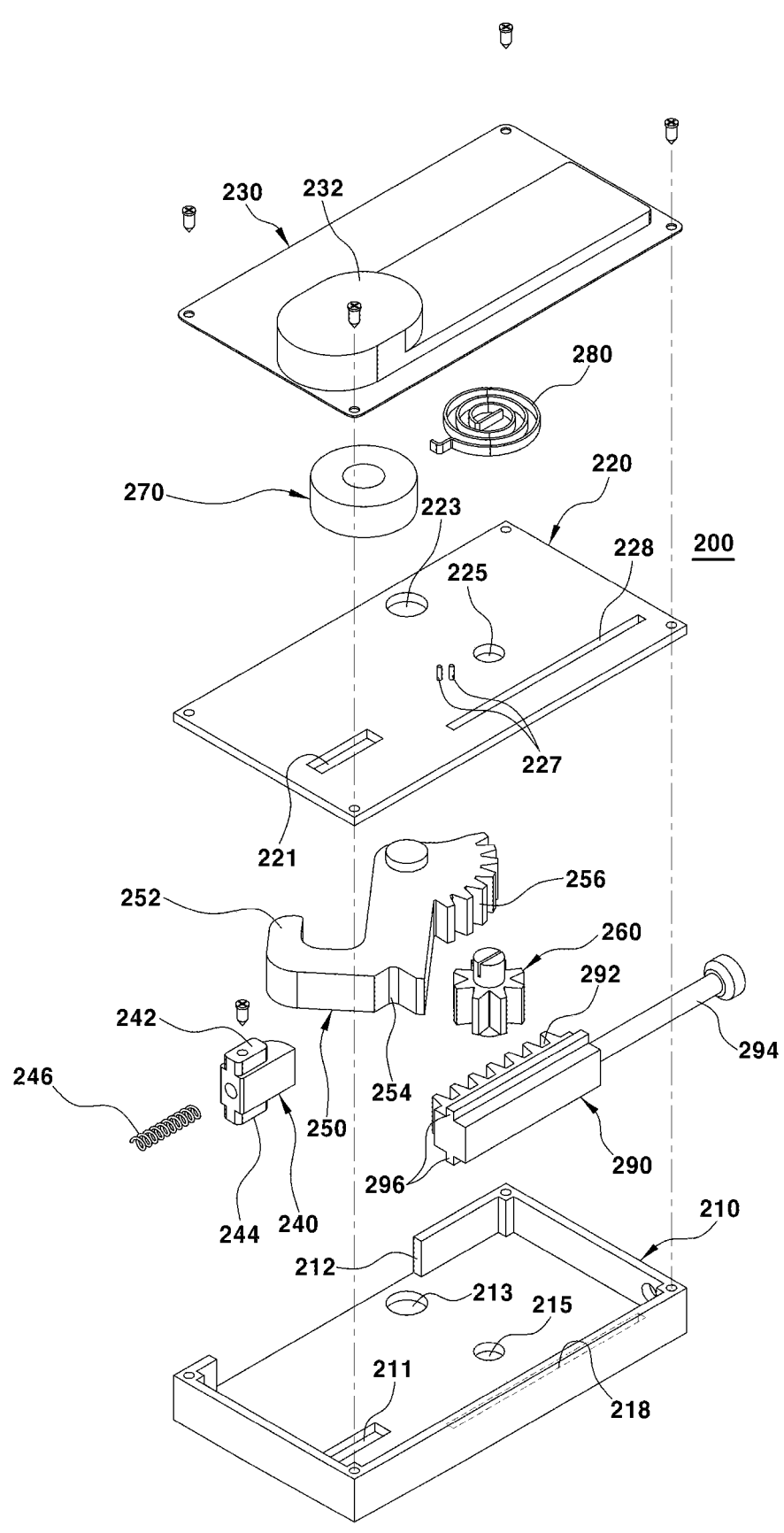
FIG. 3 is an exploded perspective view showing a locking device among components of the collision locking device for the rear split seat of the vehicle according to the present disclosure.
Figure 4:
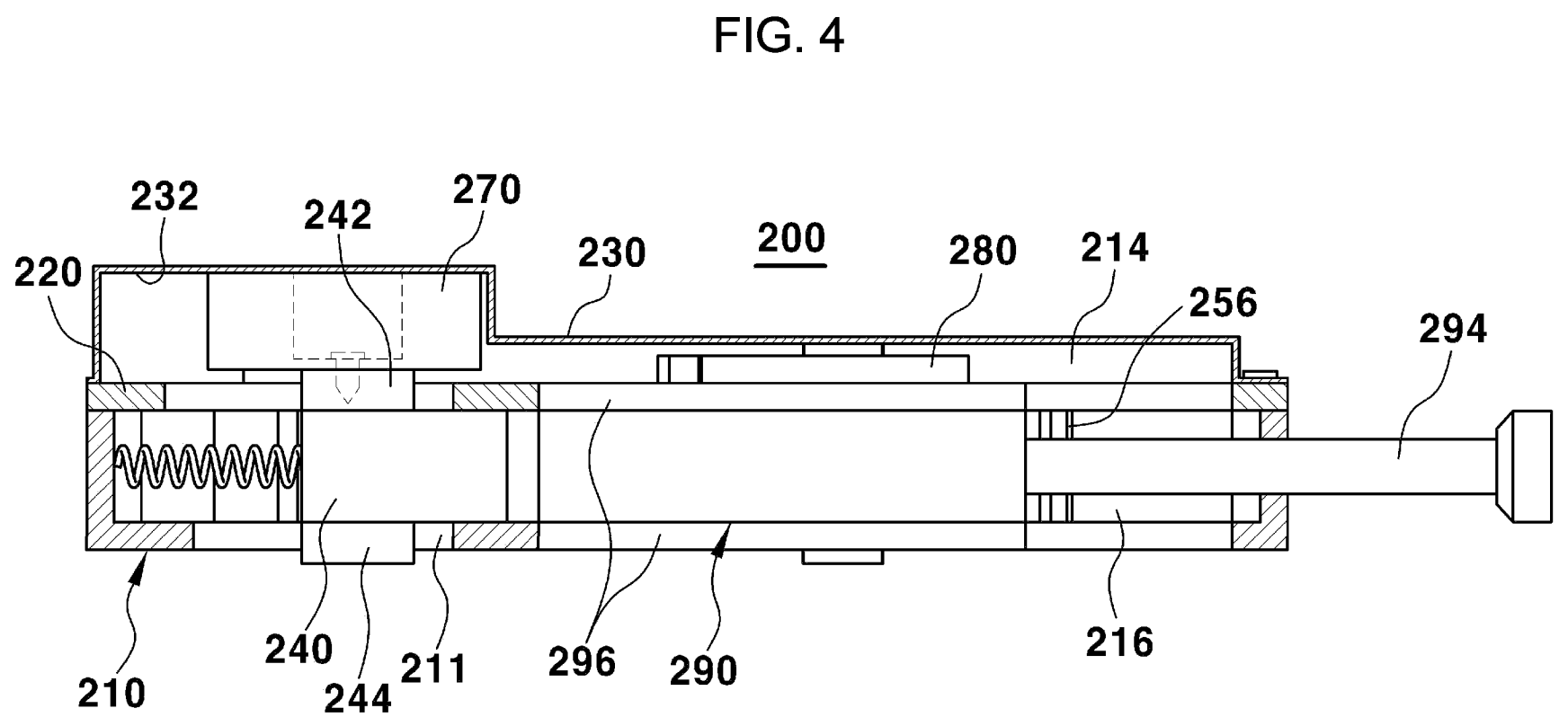
Figure 5:
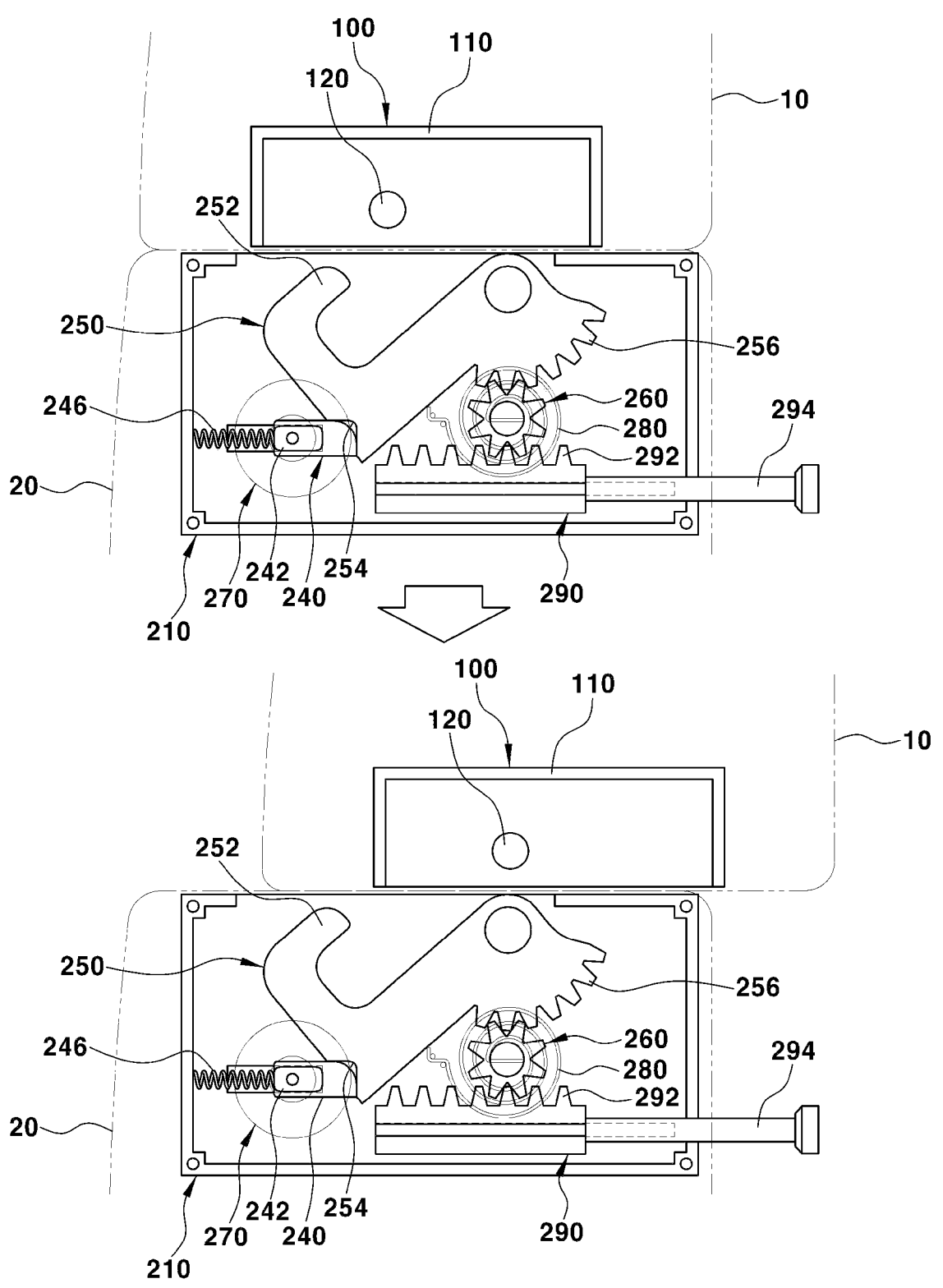
FIG. 5 is a plan cross-sectional view showing a state before operation of the collision locking device for the rear split seat of the vehicle according to the present disclosure.

FIG. 3 is an exploded perspective view showing the locking device among components of the collision locking device for the rear split seat of the vehicle according to the present disclosure, and FIGS. 4 and 5 are cross-sectional views showing the locking device among the components of the collision locking device for the rear split seat of the vehicle according to the present disclosure. Here, in each drawing, reference numeral 210 indicates a housing of the locking device 200.

The housing 210 has a second opening 212 formed on one side thereof facing the striker structure 100 and is mounted on the inner surface of the seatback of the right seat 20.

The housing 210 has a middle cover 220 mounted therein and configured to distinguish between a lower space 216 configured to allow a stopper 240, a locking trigger 250, and a middle gear 260 to be mounted therein and an upper space 214 configured to allow a weight 270 and a coil spring 280 to be mounted therein.

Additionally, the housing 210 has an upper cover 230 mounted on the upper portion thereof and configured to seal the upper space 214.

The stopper 240 is mounted at a predetermined position of a front portion of the housing 210 so as to be movable forwards and rearwards, and the weight 270 is coupled to the stopper 240 so as to be movable forwards and rearwards with the stopper 240.

To this end, the middle cover 220 has an upper slide hole 221 formed thereon, and the housing 210 has a lower slide hole 211 formed on the bottom wall thereof, in which the upper slide hole 221 and the lower slide hole 211 guide forward-and-rearward movement of the stopper 240 and the weight 270. Here, the stopper 240 has an upper guidance pin 242 and a lower guidance pin 244 respectively formed to protrude from the upper surface and the lower surface thereof and respectively inserted into the upper slide hole 221 and the lower slide hole 211 so as to movable forwards and rearwards.

In this case, the weight 270 is disposed in the upper space 214 defined between the middle cover 220 and the upper cover 230 and is coupled to the upper guidance pin 242 of the stopper 240 passing through the upper slide hole 221 of the middle cover 220, thereby moving forwards and rearwards with the stopper 240.

Preferably, the upper cover 230 has a weight receiving groove 232 formed to protrude therefrom upwards and configured to accommodate the weight 270 therein, in which the weight receiving groove 232 secures a mounting space for the weight 270 and a forward-and-rearward movement space for the weight 270.

In addition, a spring 246 compressively connects the front wall of the housing 210 to the front end of the stopper 240. The spring 246 is compressed when the stopper 240 is moved forwards and has a function of providing the stopper 240 with elastic restoring force configured to enable the stopper 240 to return in the rearward direction.

The locking trigger 250 has a hook part 252 formed at the front end thereof and caught by the striker 120, a locking groove 254 formed at a rear portion of the hook part 252 and configured to allow the rear end of the stopper 240 to be lockably inserted thereinto, and a sector gear 256 formed at the rear end thereof. In this manner, the locking trigger 250 is rotatably mounted at a predetermined position of a rear portion of the housing 210.

The middle gear 260 is engaged with the sector gear 256 of the locking trigger 250 and is rotatably mounted in the housing 210.

Substantially, the locking trigger 250 and the middle gear 260 are rotatably mounted in the lower space 216 defined between a bottom plate of the housing 210 and the middle cover 220.

To this end, the housing 210 has a first hinge hole 213 formed on the bottom wall thereof, and the middle cover 220 has a first hinge hole 223 formed thereon, in which the first hinge holes 213 and 223 allow a shaft of the locking trigger 250 to be rotatably inserted thereinto and coupled thereto. Further, the housing has a second hinge hole 215 formed on the bottom wall thereof, and the middle cover 220 has a second hinge hole 225 formed thereon, in which the second hinge holes 215 and 225 allow a shaft of the middle gear 260 to be rotatably inserted thereinto and coupled thereto.

The coil spring 280 is connected between the shaft of the middle gear 260 and a predetermined position of the housing 210 and has a function of providing elastic restoring force configured to allow the middle gear 260 to be rotated in a direction of rotating the locking trigger 250 toward the striker structure 100.

Substantially, the coil spring 280 is disposed in the upper space 214 defined between the middle cover 220 and the upper cover 230, the outer end of the coil spring 280 is connected to a spring fixing end 227 formed on the upper surface of the middle cover 220, and the inner end of the coil spring 280 is connected to the shaft of the middle gear 260 passing through the first hinge hole 223.

Meanwhile, in the lower space 216 defined between the bottom surface of the housing 210 and the middle cover 220, a locking release bar 290 configured to return the locking trigger 250 to a position restrained by the stopper 240 is further mounted so as to be movable forwards and rearwards.

To this end, the locking release bar 290 may include a rack gear 292 engaged with the middle gear 260 and an operation knob 294 formed to be integrated with the rear end of the rack gear 292 and formed to extend outwards through a rear surface of the housing 210.

Preferably, straight guidance holes 218 and 228 are respectively formed on the bottom wall of the housing 210 and the middle cover 220 so as to guide forward-and-rearward linear movement of the locking release bar 290, and the rack gear 292 has guidance protrusions 296 formed to protrude from the upper and lower portions thereof, in which each of the guidance protrusions 296 is slidably inserted into a corresponding one of the guidance holes 218 and 228.

Hereinafter, a description will be given as to an operation flow of the collision locking device for the rear split seat of the present device configured as described above.

Figure 6:
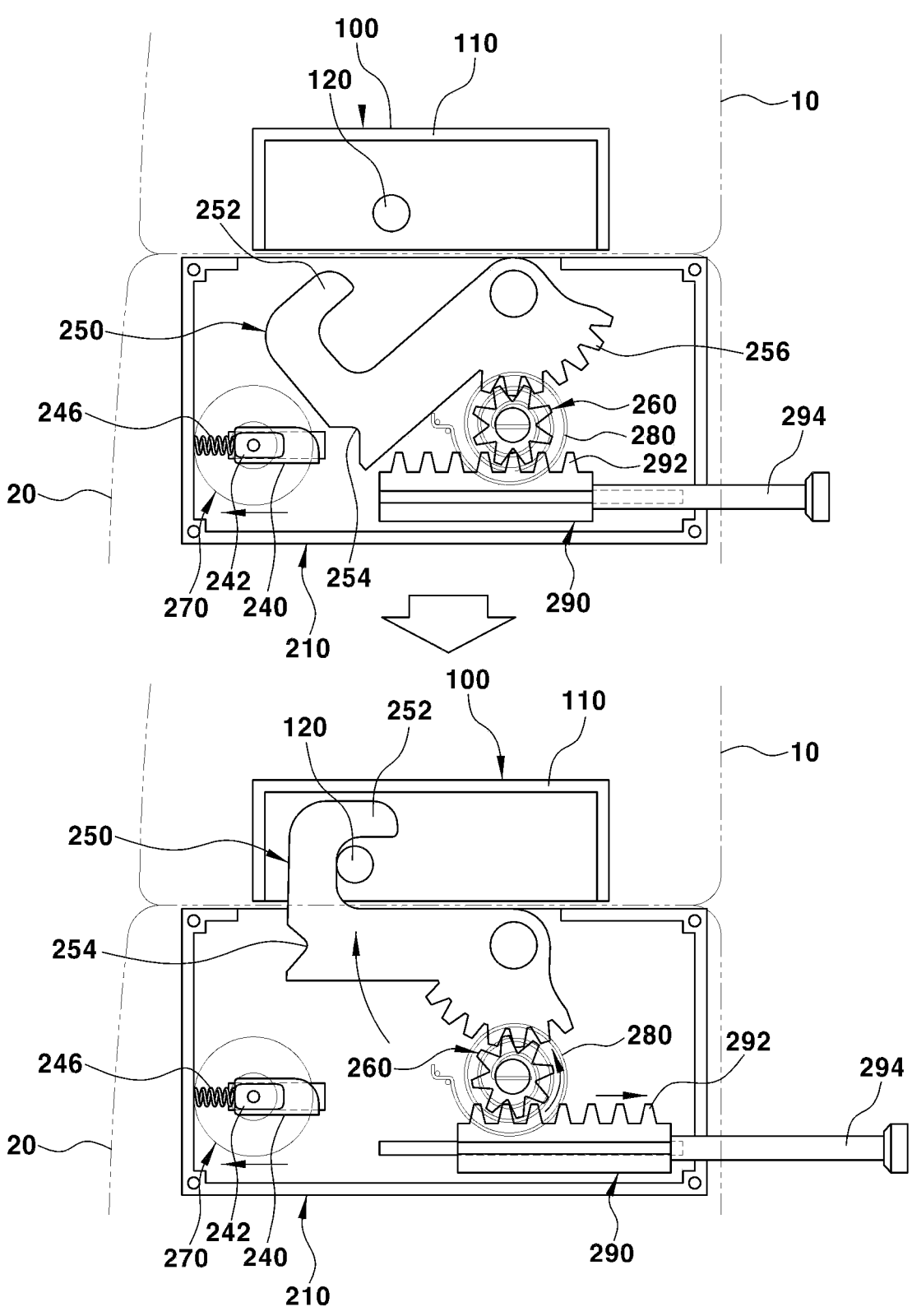
FIG. 6 is a plan cross-sectional view showing a state after operation of the collision locking device for the rear split seat of the vehicle according to the present disclosure.

FIG. 5 is a cross-sectional view showing a state before operation of the collision locking device for the rear split seat of the vehicle according to the present disclosure, and FIG. 6 is a plan cross-sectional view showing a state after operation of the collision locking device for the rear split seat of the vehicle according to the present disclosure.

As shown in FIG. 5, the rear end of the stopper 240 is normally kept locked and inserted into the locking groove 254 of the locking trigger 250.

In addition, when the rear end of the stopper 240 is locked and inserted into the locking groove 254 of the locking trigger 250, the hook part 252 of the locking trigger 250 does not protrude through the second opening 212 of the housing 210 and is located in the housing 210.

Accordingly, the striker structure 100 mounted on the seatback of the left seat 10 and the locking device 200 mounted on the seatback of the right seat 20 do not interfere with each other.

Accordingly, the seatback of the left seat 10 or the seatback of the right seat 20 is rotated around the center hinge assembly, thereby reliably performing reclining, folding, and unfolding operations.

On the other hand, when shock resulting from vehicle collision is transmitted to the weight 270, the weight 270 is moved forwards due to inertial force, as shown in FIG. 6.

Here, since the weight 270 is coupled to the stopper 240, the stopper 240 is also moved forwards with the weight 270 while compressing the spring 246.

That is, the upper guidance pin 242 and the lower guidance pin 244 of the stopper 240 are slidably moved forwards along the upper slide hole 221 and the lower slide hole 211 respectively formed on the middle cover 220 and the bottom wall of the housing 210, thereby performing forward movement of the weight 270 and stopper 240.

Simultaneously, the rear end of the stopper 240 is released from the locking groove 254 of the locking trigger 250, thereby unlocking the locking trigger 250.

Here, the middle gear 260 is rotated in one direction of rotating the locking trigger 250 toward the striker structure 100 by elastic restoring force of the coil spring 280.

That is, unidirectional rotational force of the middle gear 260 rotated by elastic restoring force of the coil spring 280 is transmitted to the sector gear 256 of the locking trigger 250, thereby allowing the locking trigger 250 to be rotated toward the striker structure 100.

Accordingly, the hook part 252 of the locking trigger 250 passes through the second opening 212 of the housing 210. Thereafter, the hook part 252 enters the case 110 of the striker structure 100 and is caught by the striker 120 so as to be locked and coupled thereto.

As described above, the hook part 252 of the locking trigger 250 is locked and coupled to the striker 120, thereby enabling the seatback of the left seat 10 and the seatback of the right seat 20 to be coupled to each other.

In this manner, in the event of vehicle collision, when the seatback of the left seat 10 and the seatback of the right seat 20 are coupled to each other, it is possible not only to prevent the seatback of the left seat 10 or the seatback of the right seat 20 from being deformed from the original position thereof, but also to reduce a degree of injury of a passenger seated on the left seat or the right seat.

In addition, the present device prevents the seatback of the left seat 10 or the seatback of the right seat 20 from deviating from the original position thereof in the event of vehicle collision, thereby making it possible not only to prevent a seatbelt anchor mounted on the seatback of the right seat including the center seat from being damaged, but also to guarantee safety of a passenger wearing a seatbelt in the event of vehicle collision.

Meanwhile, when the middle gear 260 is rotated in one direction by elastic restoring force of the coil spring 280, the locking release bar 290 is moved rearwards.

That is, unidirectional rotational force of the middle gear 260 is transmitted to the rack gear 292 of the locking release bar 290, thereby performing rearward movement of the locking release bar 290.

In this case, when the locking release bar 290 is moved rearwards, the operation knob 294 formed to be integrated with the rear end of the rack gear 292 is also moved rearwards so as to further protrude from the rear surface of the housing 210.

Thereafter, when a user presses the operation knob 294 of the locking release bar 290, the locking trigger 250 may be returned to the original position thereof.

That is, when the user presses the operation knob 294, the rear end of the stopper 240 is locked to and inserted into the locking groove 254 of the locking trigger 250, and the hook part 252 of the locking trigger 250 may be returned to the original position thereof in the housing 210 without protruding through the second opening 212 of the housing 210.

More specifically, when the operation knob 294 is pressed, the hook part 252 of the locking trigger 250 may be returned to the original position thereof in the housing 210 without protruding through the second opening 212 of the housing 210 through a process in which the rack gear 292 is moved forwards, a process in which the middle gear 260 engaged with the rack gear 292 is rotated in the other direction, and a process in which the sector gear 256 of the locking trigger 250 engaged with the middle gear 260 is returned to the original position thereof.

Here, the stopper 240 is moved rearwards by elastic restoring force of the spring 246, thereby allowing the rear end of the stopper 240 to be locked to and inserted into the locking groove 254 of the locking trigger 250 again. Accordingly, the locking trigger 250 may be maintained in a locked state at the original position thereof in the housing 210.

As is apparent from the above description, the present device provides the following effects.

First, in the event of vehicle collision, a seatback of a left seat and a seatback of a right seat are coupled to each other by a locking device operated by inertial force, thereby making it possible to prevent the seatback of the left seat or the seatback of the right seat from being deformed from the original position thereof.

Second, the seatback of the left seat or the seatback of the right seat is prevented from deviating from the original position thereof in the event of vehicle collision, thereby making it possible to reduce a degree of injury of a passenger seated on the left seat or the right seat.

Third, the seatback of the left seat or the seatback of the right seat is prevented from deviating from the original position thereof in the event of vehicle collision, thereby making it possible not only to prevent a seatbelt anchor mounted on the seatback of the right seat including the center seat from being damaged, but also to guarantee safety of a passenger wearing a seatbelt in the event of vehicle collision.

The present device has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

What is claimed is:

1. A collision locking device for a rear split seat of a vehicle, the collision locking device comprising:

a striker structure mounted on a first seatback of a first seat of the rear split seat; and a locking device mounted on a second seatback of a second seat of the rear split seat and operated so as to be locked and coupled to the striker structure by inertial force resulting from vehicle collision, wherein the first seatback of the first seat and the second seatback of the second seat are coupled to each other by a locking operation of the locking device configured to be locked and coupled to the striker structure, wherein the striker structure comprises:

a case including a first opening formed on one side thereof, the one side configured to face the locking device; and a striker configured to connect an upper surface of the case and a lower surface thereof and be exposed toward the locking device, and wherein the locking device is configured to pass through the first opening of the case and be coupled to the striker by the inertial force.

2. The collision locking device of claim 1, wherein the locking device comprises:

a housing including a second opening formed on one side thereof, the one side configured to face the striker structure;

a stopper mounted at a predetermined position of a front portion of the housing so as to be movable forward and rearward;

a spring configured to compressively connect a front wall of the housing to the stopper;

a weight coupled to the stopper;

a locking trigger including a hook part formed at a front end thereof and caught by the striker, a locking groove formed at a rear portion of the hook part and configured to allow a rear end of the stopper to be lockably inserted thereinto, and a sector gear formed at a rear end of the locking trigger, the locking trigger configured to be rotatably mounted at a first predetermined position of a rear portion of the housing;

a middle gear configured to be engaged with the sector gear of the locking trigger and be rotatably mounted in the housing; and a coil spring extending between a shaft of the middle gear and a second predetermined position of the housing, the coil spring configured to provide an elastic restoring force allowing the middle gear to be rotated such that the locking trigger is rotated toward the striker structure.

3. The collision locking device of claim 2, wherein the housing includes a middle cover mounted in the housing and an upper cover mounted on an upper portion of the housing, the middle cover configured to distinguish between a lower space configured to accommodate the stopper, the locking trigger, and the middle gear and an upper space configured to accommodate the weight and the coil spring, and the upper cover configured to seal the upper space.

4. The collision locking device of claim 3, wherein the middle cover includes an upper slide hole formed thereon, and the housing includes a lower slide hole formed on a bottom wall thereof, wherein the upper slide hole and the lower slide hole are configured to guide forward-and-rearward movement of the stopper and the weight, wherein the stopper includes an upper guidance pin and a lower guidance pin formed to protrude respectively from an upper surface and a lower surface of the stopper, and wherein the upper guidance pin and the lower guidance pin are configured to be respectively inserted into the upper slide hole and the lower slide hole.

5. The collision locking device of claim 4, wherein the weight is coupled to the upper guidance pin of the stopper passing through the upper slide hole.

6. The collision locking device of claim 3, wherein the upper cover includes a weight receiving groove formed to accommodate the weight therein and configured to secure a space for forward-and-rearward movement of the weight.

7. The collision locking device of claim 3, wherein each of the housing and the middle cover includes a first hinge hole and a second hinge hole, the first hinge hole and the second hinge hole are formed on a bottom wall of the housing and the middle cover, the first hinge hole is configured to allow a shaft of the locking trigger to be rotatably inserted thereinto and coupled thereto, and the second hinge hole is configured to allow the shaft of the middle gear to be rotatably inserted thereinto and coupled thereto.

8. The collision locking device of claim 7, wherein the middle cover includes a spring fixing end formed on an upper surface thereof and connected to an outer end of the coil spring, and the coil spring includes an inner end connected to the shaft of the middle gear passing through the first hinge hole.

9. The collision locking device of claim 3, wherein the lower space between a bottom wall of the housing and the middle cover includes a locking release bar further mounted therein and configured to be movable forward and rearward, and wherein the locking release bar comprises:

a rack gear configured to be engaged with the middle gear; and an operation knob formed to be integrated with a rear end of the rack gear and formed to extend outward through a rear wall of the housing.

10. The collision locking device of claim 9, wherein guidance holes are respectively formed on the bottom wall of the housing and the middle cover, and the rack gear includes guidance protrusions respectively formed on an upper side and a lower side thereof, and wherein each of the guidance protrusions is configured to be slidably inserted into a corresponding one of the guidance holes.

11. The collision locking device of claim 1, wherein the first seat is a left seat and the second seat is a right seat.

12. A collision locking device for a rear split seat of a vehicle, the collision locking device comprising:

a striker structure mounted on a first seatback of a first seat of the rear split seat; and a locking device mounted on a second seatback of a second seat of the rear split seat and operated so as to be locked and coupled to the striker structure by inertial force resulting from vehicle collision, wherein the first seatback of the first seat and the second seatback of the second seat are coupled to each other by a locking operation of the locking device configured to be locked and coupled to the striker structure, wherein the locking device comprises:

a housing including a second opening formed on one side thereof, the one side configured to face the striker structure;

a stopper mounted at a predetermined position of a front portion of the housing so as to be movable forward and rearward;

a spring configured to compressively connect a front wall of the housing to the stopper;

a weight coupled to the stopper;

a locking trigger including a hook part formed at a front end thereof and caught by the striker structure, a locking groove formed at a rear portion of the hook part and configured to allow a rear end of the stopper to be lockably inserted thereinto, and a sector gear formed at a rear end of the locking trigger, the locking trigger configured to be rotatably mounted at a first predetermined position of a rear portion of the housing;

a middle gear configured to be engaged with the sector gear of the locking trigger and be rotatably mounted in the housing; and a coil spring extending between a shaft of the middle gear and a second predetermined position of the housing, the coil spring configured to provide an elastic restoring force allowing the middle gear to be rotated such that the locking trigger is rotated toward the striker structure.

13. The collision locking device of claim 12, wherein the housing includes a middle cover mounted in the housing and an upper cover mounted on an upper portion of the housing, the middle cover configured to distinguish between a lower space configured to accommodate the stopper, the locking trigger, and the middle gear and an upper space configured to accommodate the weight and the coil spring, and the upper cover configured to seal the upper space.

14. The collision locking device of claim 13, wherein the middle cover includes an upper slide hole formed thereon, and the housing includes a lower slide hole formed on a bottom wall thereof, wherein the upper slide hole and the lower slide hole are configured to guide forward-and-rearward movement of the stopper and the weight, wherein the stopper includes an upper guidance pin and a lower guidance pin formed to protrude respectively from an upper surface and a lower surface of the stopper, and wherein the upper guidance pin and the lower guidance pin are configured to be respectively inserted into the upper slide hole and the lower slide hole.

15. The collision locking device of claim 14, wherein the weight is coupled to the upper guidance pin of the stopper passing through the upper slide hole.

16. The collision locking device of claim 13, wherein the upper cover includes a weight receiving groove formed to accommodate the weight therein and configured to secure a space for forward-and-rearward movement of the weight.

17. The collision locking device of claim 13, wherein each of the housing and the middle cover includes a first hinge hole and a second hinge hole, the first hinge hole and the second hinge hole are formed on a bottom wall of the housing and the middle cover, the first hinge hole is configured to allow a shaft of the locking trigger to be rotatably inserted thereinto and coupled thereto, and the second hinge hole is configured to allow the shaft of the middle gear to be rotatably inserted thereinto and coupled thereto.

18. The collision locking device of claim 17, wherein the middle cover includes a spring fixing end formed on an upper surface thereof and connected to an outer end of the coil spring, and the coil spring includes an inner end connected to the shaft of the middle gear passing through the first hinge hole.

19. The collision locking device of claim 13, wherein the lower space between a bottom wall of the housing and the middle cover includes a locking release bar further mounted therein and configured to be movable forward and rearward, and wherein the locking release bar comprises:

a rack gear configured to be engaged with the middle gear; and an operation knob formed to be integrated with a rear end of the rack gear and formed to extend outward through a rear wall of the housing.

* * * * *